United States Patent [19]

Oku et al.

[11] Patent Number: 4,875,042
[45] Date of Patent: Oct. 17, 1989

[54] MULTI CHANNEL TEMPERATURE CONTROLLER UTILIZING ELECTRONIC MULTIPLEXER

[75] Inventors: Seiji Oku, Mishima; Tooru Shimamura, Muko; Kazutomo Naganawa, Suita; Toshiya Tanamura, Nagaokakyo, all of Japan

[73] Assignee: Omron Tateisi Electronics Co., Kyoto, Japan

[21] Appl. No.: 2,328

[22] Filed: Jan. 12, 1987

[30] Foreign Application Priority Data

Jan. 10, 1986 [JP] Japan ............................ 61-2160[U]
Jan. 13, 1986 [JP] Japan ............................ 61-3184[U]

[51] Int. Cl.$^4$ ............................................ G08C 19/30
[52] U.S. Cl. .......................... 340/870.170; 340/870.13; 340/870.110; 374/175
[58] Field of Search .................. 340/870.170, 110; 374/170, 171, 175; 370/77, 100

[56] References Cited

U.S. PATENT DOCUMENTS

| | | | |
|---|---|---|---|
| 3,800,300 | 3/1974 | Van Oosterhout | 340/870.17 |
| 4,122,719 | 10/1978 | Carlson et al. | 374/171 |
| 4,215,336 | 7/1980 | Smith | 340/870.17 |
| 4,480,312 | 10/1984 | Wingate | 374/170 |
| 4,557,608 | 12/1985 | Carver | 340/870.17 |
| 4,563,682 | 1/1986 | Merkel | 340/870.17 |
| 4,680,585 | 7/1987 | Fasching | 340/870.13 |
| 4,704,609 | 11/1987 | Rittenberry et al. | 340/870.17 |

OTHER PUBLICATIONS

"Sense Temp. Remotely with IC Temp./Current Transducers", by Walter G. Jung, Electronic Design, Sep. 1, 1978.

Primary Examiner—Donald J. Yusko
Assistant Examiner—Tyrone Queen
Attorney, Agent, or Firm—Wegner & Bretschneider

[57] ABSTRACT

This multi channel temperature controller includes several temperature sensors, an electronic multiplexer which receives output signals from these temperature sensors and which sequentially supplies these signals to its output according to the switching action of a selection signal, and an amplifier which receives the output of the electronic multiplexer. Thereby, noise such as due to thermal electro motive force generated in the contacts of prior art sets of reed relays for switching over such temperature sensor output signals can be eliminated. Further, optionally, there may be provided several input circuits, one interposed between each of these temperature sensors and the electronic multiplexer, and each including a capacitor which has electrostatic capacitance substantially greater than the electrostatic capacitance existing between its input circuit and the corresponding temperature sensor. Thereby, common mode voltage noises are eliminated or minimized.

5 Claims, 4 Drawing Sheets

MULTI CHANNEL TEMPERATURE CONTROLLER UTILIZING ELECTRONIC MULTIPLEXER

BACKGROUND OF THE INVENTION

The present invention relates to a multi channel temperature controller which performs temperature control by selectively switching over input signals from a plurality of temperature sensors such as thermocouples in a sequential manner, and more particularly relates to such a multi channel temperature controller, particularly improved with regard to its accuracy and its freedom during operation from disturbing influences such as electrical noise.

In the prior art, there have been proposed various types of multi channel temperature controller. Particularly, for selectively switching over a plurality of input signals which are supplied to such a multi channel temperature controller, the switching over action of the contacts of reed relays or the like is conventionally utilized. Such a typical prior art multi channel temperature controller is shown in FIG. 3 of the accompanying drawings in schematic block diagrammatical view. In this figure, the reference symbols S11 through Sn1 denote temperature sensors, and A2 is an amplifier, while Sw11 through Swn1 and Sw12 through Swn2 are reed relays which connect the temperature sensors S11 through Sn1 to the amplifier A2.

Since the signal common amplifier A2 is shared by the plurality of temperature sensors S11 through Sn1, the reed relays Sw11 through Swn1 and Sw12 through Swn2 are necessarily required to be switched over in a sequential manner. In other words, the output signals from the plurality of temperature sensors S11 through Sn1, indicative of the temperatures in the vicinities of said sensors S11 through Sn1, are sequentially supplied to the amplifier A2 via the reed relays Sw11 through Swn1 and Sw12 through Swn2, in order to measure the temperatures in a plurality of locations at which said temperature sensors S11 through Sn1 are disposed. These temperature sensors S11 through Sn1 are provided with compensation circuits at their respective wiring connections.

Now, in order to assure accurate measurements of temperature, since it is typical to use as such temperature sensors S11 through Sn1 such devices as thermo couples which generate relatively weak electro motive force as their output signals, it is necessary to eliminate all extraneous sources of electro motive force in the circuits for the output signals for said temperature sensors S11 through Sn1, i.e. to eliminate all thermal or other electro motive force in said circuits generated outside the locations at which the temperature measurements are conducted.

However, the metal which is utilized for making the contacts of the reed relays Sw11 through Swn1 and Sw12 through Swn2 is generally a metal which is different from the metal, typically copper, which is used for connecting said reed relays Sw11 through Swn1 and Sw12 through Swn2 to the printed circuit board on which typically the whole construction is mounted. This aspect of the problem is particularly illustrated in cross sectional view in FIG. 4 of the accompanying drawings.

In this figure: the reference symbol Sw denotes one of the reed relays Sw11 through Swn1 or Sw12 through Swn2; P is the printed circuit board; M1, M1 are the metal contact members of the reed relay Sw; M2, M2 are copper strips formed on said printed circuit board for conducting the signals to and from this reed relay Sw; and H1 and H2 are portions of solder which are used for joining said metal contact members M1, M1 to said copper strips M2, M2. Since the metal contact members M1, M2 and the copper strips M2, M2 are typically formed from two different metals (i.e. typically the metal contact members M1, M2 are not formed from copper), some thermal electro motive force is inevitably generated in the solder material portions H1, H1. In other words, when electric current is being conducted through this reed relay Sw, some thermal electro motive force is also inevitably generated in said reed relay Sw, and this thermal electro motive force, although external to the temperature sensors (the thermo couples S11 through Sn1 of FIG. 3), i.e. although not being located at the positions at which it is intended to perform temperature measurements, is inevitably inputted to the amplifier A2 as an interference signal. In other words, the voltage that is inputted to said amplifier A2 differs from the voltage that is generated at the thermo couples S11 through Sn1, by this interference electro motive force.

Further, since this is a multi channel temperature controller, since a plurality of the reed relays Sw11 through Swn1 and Sw12 through Swn2 are utilized, and since it is in practice extremely difficult to maintain the temperatures of the surroundings of these reed relays Sw11 through Swn1 and Sw12 through Swn2 substantially identical to one another, the interference voltage produced as described above by each individual one of the reed relays Sw11 through Swn1 and Sw12 through Swn2 is inevitably different.

Moreover, the contacting performance of such a reed relay which includes contacts is not always satisfactory; in fact, such reed relays are very prone to bad contacts.

Accordingly, in the prior art, for the above identified reasons, the problem has occurred that it is not practicable to perform accurate temperature measurements.

Further, the use of such reed relays including contact members is subject to the problems that such reed relays have limited service lives and are not extremely reliable. Certainly such reed relays are not suitable for high speed switching over such as occurs during scanning. Additionally, the need for a relatively large number of reed relays inevitably increases the cost of a multi channel type temperature controller, as well as increasing the size thereof.

Another problem which exists with prior art multi channel type temperature controllers is that, since typically such a multi channel type temperature controller is adapted to serve a large number of different locations for temperature measurement, the length of the wiring between these locations for temperature measurement and the temperature controller which receives signals representative of the measured temperatures tends to be relatively great. And, as the length of such wiring increases, the stray capacitance of such wiring concomitantly inevitably increases.

FIG. 5 of the accompanying drawings shows the influence of ambient noise on the wiring when the length of such wiring is relatively large. In this figure, the reference numeral 1 denotes a temperature sensor, which may be a thermo couple or the like, and which is placed at a location at which the temperature is desired to be measured. And the reference numeral 2 denotes a temperature controller for receiving the signal from the temperature sensor 1, while the reference numeral 3 denotes wiring which connects the temperature sensor 1 to the temperature controller 2.

The symbolic AC voltage Vc1 represents the noise source voltage which is generated in the vicinity of the temperature sensors 1, while the other symbolic AC voltage Vc2 represents a noise source voltage which is generated in the intermediate portions of the wiring 3. And the symbolic capacitance CF1 represents a stray capacitance which is present in the vicinity of the temperature sensor 1, while the other symbolic capacitance CF2 represents a stray capacitance which is present in the intermediate portions of the wiring 3.

As the length of the wiring 3 is increased, capacitive couplings are produced, and the AC components of the resulting common mode voltage noises affect the measurements of temperature which are produced, in the form of errors. And, as the locations for the temperature measurements are changed, so the noise source voltages Vc1 and Vc2 and the stray capacitances CF1 and CF2 are changed. In other words, the common mode voltage noises in the wiring vary depending upon the locations for temperature measurement, since naturally along with such change of the locations for temperature measurement the lengths and the dispositions of the various wiring segments also change.

It would therefore be desirable to eliminate such common mode voltage noise which has an AC component, since it causes errors in temperature measurements as described above. An example of a prior art technique for performing such a process is described in Japanese Patent Publication Serial No. 53-16695 (1978). The outline of this technique will now be described with reference to the schematic diagram given in FIG. 6 of the accompanying drawings.

In FIG. 6, S11, S12, . . . are temperature sensors, and IN11, IN12, . . . are input circuits which use isolation transformers or isolation amplifiers, while MPX1 is an input selection circuit such as an analog type electronic multiplexer which converts a plurality of input signals into a single output signal. SI1 through SI3 are selection signals, and Sout is the output signal.

The values of the common mode voltage noises produced at the input points of the input circuits IN11, IN12, . . . vary depending upon the locations at which the temperature sensors S11, S12, . . . are disposed, and upon the distances between said temperature sensors S11, S12, . . . and the input circuits IN11, IN12, . . . . Therefore, after the common mode voltage noises are eliminated by using the isolation transformers or isolation amplifiers incorporated in said input circuits IN11, IN12, . . . , the signals are supplied to the input selection circuit MPX1, and leak arising from the common mode voltage noises is avoided.

However, this construction entails the need for the input circuits IN11, IN12, . . . to be of isolation types utilizing isolation transformers or isolation amplifiers, and one of these input circuits IN11, IN12, . . . is required to be provided for each of the temperature sensors S11, S12, . . . . Thereby, not only are the size and weight of the multi channel temperature controller increased, but also its manufacturing cost is increased due to the provision of this complicated circuit structure which includes a multitude of constituent parts.

SUMMARY OF THE INVENTION

The inventors of the present invention have considered the various problems detailed above in the case of a multi channel temperature controller, in order to improve upon the construction and operation thereof.

Accordingly, it is the primary object of the present invention to provide a multi channel temperature controller, which avoids the problems detailed above.

Accordingly, it is the primary object of the present invention to provide a multi channel temperature controller, which is capable of more accurate temperature measurement and/or control than has heretofore been possible.

It is a further object of the present invention to provide such a multi channel temperature controller, which avoids problems arising with respect to noise electro motive force created at reed switches thereof.

It is a further object of the present invention to provide such a multi channel temperature controller, which does not require any various portions thereof to be kept at standard, or at identical, temperatures.

It is a further object of the present invention to provide such a multi channel temperature controller, which is not subject to performance variations due to possibly differential temperature alterations of portions thereof.

It is a further object of the present invention to provide such a multi channel temperature controller, which is not subject to operational problems due to bad contacting of reed switches thereof.

It is a further object of the present invention to provide such a multi channel temperature controller, which is capable of accurate temperature measurement, at a plurality of locations, in a reliable fashion.

It is a further object of the present invention to provide such a multi channel temperature controller, which is capable of accurate temperature measurement, even if said plurality of locations are relatively widely separated.

It is a further object of the present invention to provide such a multi channel temperature controller, which has a long service life.

It is a further object of the present invention to provide such a multi channel temperature controller, which is of high reliability.

It is a further object of the present invention to provide such a multi channel temperature controller, which is suitable for high speed switching over, i.e. scanning.

It is a yet further object of the present invention to provide such a multi channel temperature controller, the locations of the temperature sensors of which can be freely altered without thereby inviting operational error.

It is a yet further object of the present invention to provide such a multi channel temperature controller, which does not require any isolation transformer or isolation amplifier to be provided for each of its temperature sensors.

It is a yet further object of the present invention to provide such a multi channel temperature controller, the size of which is minimized.

It is a yet further object of the present invention to provide such a multi channel temperature controller, the overall cost of which is minimized.

It is a yet further object of the present invention to provide such a multi channel temperature controller, which minimizes cost of components.

It is a yet further object of the present invention to provide such a multi channel temperature controller, which minimizes cost of assembly.

It is a yet further object of the present invention to provide such a multi channel temperature controller, which minimizes complication of structure.

It is a yet further object of the present invention to provide such a multi channel temperature controller, which is compact and light in weight.

According to the most general aspect of the present invention, these and other objects are attained by a multi channel temperature controller, comprising: a plurality of temperature sensors; an electronic multiplexer which receives output signals from said plurality of temperature sensors and which sequentially supplies said signals to its output according to the switching action of a selection signal; and: an amplifier which receives said output of said electronic multiplexer.

According to such a multi channel temperature controller as specified above, since an electronic multiplexer is utilized for switching over the signals from the plurality of temperature sensors to the amplifier, instead of the reed relays which were utilized in the prior art as described above, thereby the problems outlined above with regard to the prior art are eliminated or at least mitigated. In other words, there is no risk of this multi channel temperature controller according to the present invention being prone to external interference in the form of thermal electro motive force generated at locations other than those where the temperature sensors themselves are provided, and further the problem of bad contacts, which is inevitably endemic in the case of reed relays, is averted. Accordingly, the accuracy of temperature measurement is improved, as contrasted with the prior art.

Further, since an electronic multiplexer is more durable than a set of reed switches, and is more suited for high speed switching over such as required during scanning, this multi channel temperature controller of the present invention is enabled of a long service life and of high reliability. Additionally, since a single electronic multiplexer is utilized for switching over the signals from the plurality of temperature sensors to the amplifier, instead of the plurality of reed relays which were utilized in the prior art as described above, thereby the size and the cost of the multi channel temperature controller of the present invention can be advantageously minimized.

Further, according to a particular specialization of the present invention, the above and other objects may more particularly be accomplished by such multi channel temperature controller as first specified above, further comprising a plurality of input circuits, one interposed between each said temperature sensor and said electronic multiplexer, and each comprising a capacitor which has electrostatic capacitance substantially greater than the electrostatic capacitance existing between its said input circuit and the corresponding said temperature sensor. In this case, there will be a further advantage gained, in that the AC components of the common mode voltage noises produced in the temperature sensors and in the wiring between said temperature sensors and these input circuits can be made sufficiently smaller than the mutual leakage voltages of these input circuits of the electronic multiplexer at their input ends.

Accordingly, the accuracy of temperature measurement can be increased even further than heretofore.

Furthermore, since as above the common mode voltage noises are eliminated and the leakage arising due to the presence of these common mode voltage noises is prevented without using any type of isolation or insulation input circuit such as one utilizing an isolation or insulation transformer or amplifier, thereby the size of the multi channel temperature controller of the present invention, as well as its manufacturing cost, can be advantageously minimized through the employment of a simplified structure.

Also, it will be understood that this multi channel temperature controller of the present invention can provide the benefit of performing high accuracy temperature measurement and control at a plurality of locations, even when said locations are relatively widely mutually separated and the wiring leading to the temperature sensors provided at said locations is relatively long in length, so that the level of common mode voltage noise is inevitably relatively high.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and so on in the various figures; and:

DESCRIPTION OF THE PREFERRED EMBODIMENT

Figure 1:
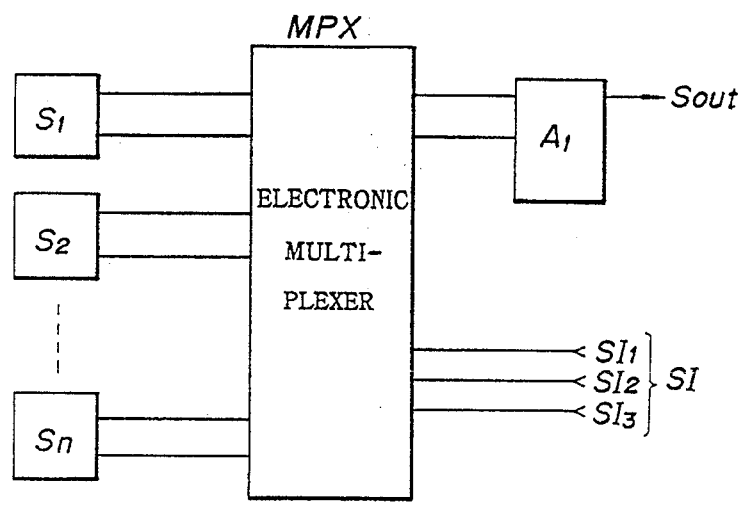
FIG. 1 is a schematic block circuit diagram of the preferred embodiment of the multi channel temperature controller of the present invention.
Figure 2:
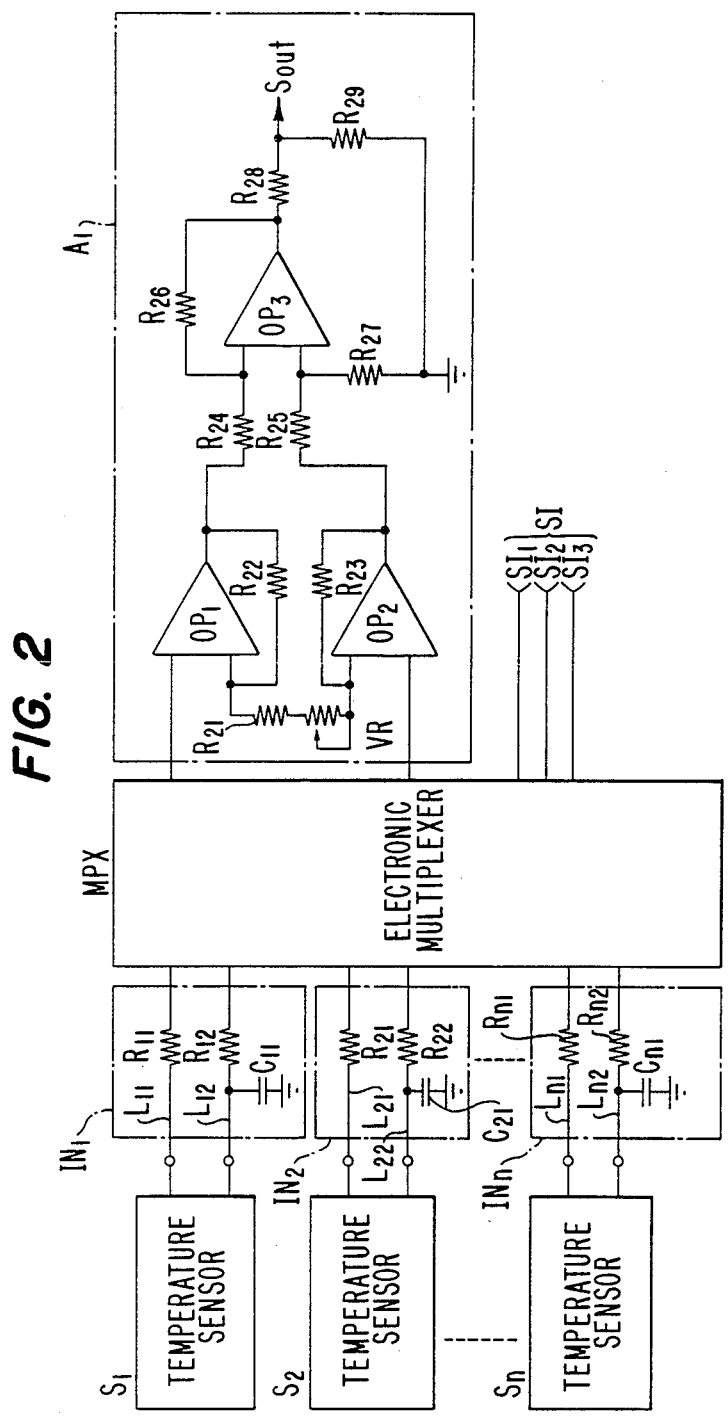
FIG. 2 is a more detailed circuit diagram of said preferred embodiment of multi channel temperature controller.
Figure 3:
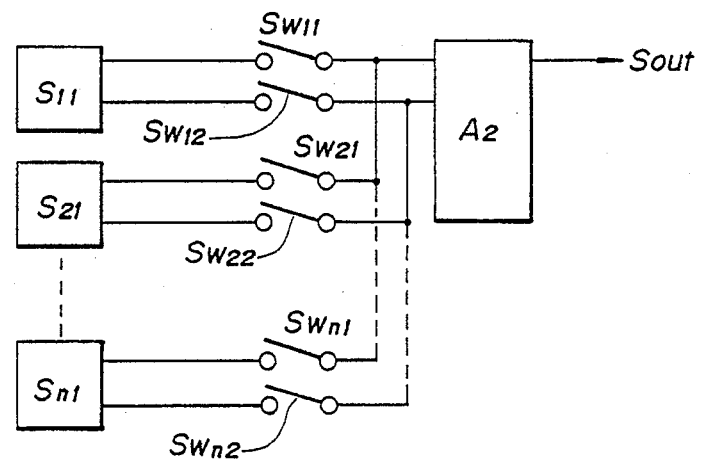
FIG. 3 is a similar block circuit diagram to FIG. 1, relating to a prior art type multi channel temperature controller.

The present invention will now be described with reference to the preferred embodiment thereof, and with reference to FIGS. 1 and 2. This preferred embodiment of the multi channel temperature controller of the present invention is shown by a schematic overall block circuit diagram in FIG. 1, and it comprises a plurality of temperature sensors denoted as S1 . . . Sn which are all connected to an amplifier designated as A1, which thus is common to all said temperature sensors S1 . . . Sn, via an analog electronic multiplexer shown a MPX. In other words, a plurality of input terminals of said electronic multiplexer MPX are connected one to each of the temperature sensors S1 . . . Sn, while two output terminals of said electronic multiplexer MPX are connected to the inputs of the amplifier A1. This electronic multiplexer MPX receives input of three (in this case) selection signals SI1, SI2, and SI3, and according to the switching over action provided thereby supplies the input signals from the temperature sensors S1 . . . Sn sequentially to the amplifier A1.

The temperature sensors S1 . . . Sn include compensation circuits, not particularly shown, provided at their wiring connections. And the symbol Sout denotes the output of the amplifier A1, which is an output signal for temperature control.

Figure 4:
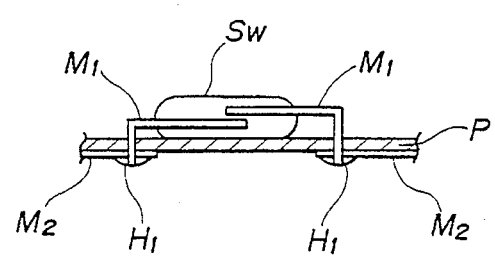
FIG. 4 is a schematic longitudinal sectional view of a reed relay incorporated in the prior art multi channel temperature controller of FIG. 3.
Figure 5:
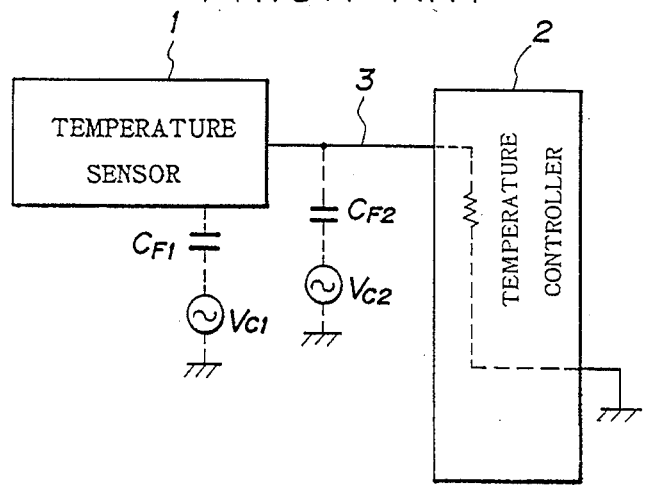
FIG. 5 is a symbolic diagram relating to any type of temperature controller, for illustrating the effects of ambient noise sources when the length of the wiring joining between a sensor of said temperature controller and the main body thereof is relatively long.
Figure 6:
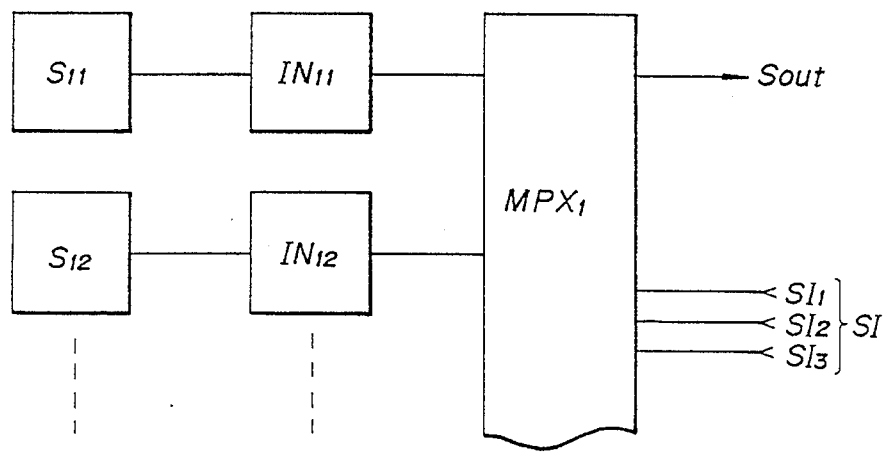
FIG. 6 is a block circuit diagram similar to FIGS. 1 and 3, relating to another prior art type of multi channel temperature controller.

According to this multi channel type temperature controller, since the multiplexer MPX which is used for selectively supplying the input signals from the temperature sensors S1 . . . Sn to the amplifier A1 is of an electronic type, rather than being of a mechanical type incorporating reed relays or the like in as was the case with the prior art as detailed earlier in this specification, thereby the problems outlined above with regard to said prior art can be eliminated or avoided. In other words, there is no source of external electro motive force interference such as thermal electro motive force, arising at locations other than those at which the temperature sensors S1 . . . Sn are provided and at which it is desired to conduct temperature measurement and control, and further there is no problem of the occurrence of bad contacting, such as might be the case if reed relays like the FIG. 4 relay were employed. Therefore, the accuracy of temperature measurement can be improved, as compared with the prior art.

Further, an electronic multiplexer such as the electronic multiplexer MPX is more durable and is better fit for high speed switching over such as scanning, than is a set of reed relays such as outlined above with regard to the prior art. Additionally, since a single such electronic multiplexer MPX is used instead of a relatively large number of such reed relays utilized in such prior art, an economy of components is effected, and thereby the size and the complication and therefore the cost of the multi channel temperature controller of the present invention can be advantageously minimized.

Now, referring to FIG. 2, this preferred embodiment of the multi channel temperature controller of the present invention will be described in greater detail. Particularly, this FIG. 2 is a more detailed circuit diagram showing certain input circuits from the temperature sensors S1 . . . Sn to the electronic multiplexer MPX as IN1 through INn respectively, and showing an exemplary circuit structure for the amplifier A1.

In these input circuits IN1 . . . INn, resistors R11 through Rn1 and R12 through Rn2 are connected in series in the leads from the temperature sensors S1 . . . Sn to the electronic multiplexer MPX, in pairs respectively, and further condensers C11 through Cn1 are connected between one of said leads and ground, again respectively. Further, the amplifier A1 comprises operational amplifiers OP1, OP2; and OP3, resistances R21 through R29, and a variable resistor VR. This amplifier A1 has a unit gain (gain equal to unity), and further has a high common mode rejection ratio CMR.

The electrostatic capacitances of the capacitors C11 . . . Cn1 in the input circuits IN1 . . . INn are arranged to be sufficiently greater than any stray capacitances that inevitably will be present between the temperature sensors S1 . . . Sn and said input circuits IN1 . . . INn.

Therefore, the AC components of the common mode voltage noises produced in the temperature sensors S1 . . . Sn and also in the wiring between said temperature sensors S1 . . . Sn and the electronic multiplexer MPX can be made sufficiently much smaller than the mutual leak voltages of the input signals of the electronic multiplexer MPX at the input sides of the input circuits IN1 . . . INn. As a result, the accuracy of the temperature measurement can be increased even more.

The provision of the amplifier A1 including the operational amplifiers OP1, OP3, and OP3, as well as the resistors R21 through R29 and the variable resistor VR, prevents any ill effects arising from the common mode voltage noises which may exist even though its level may be lower than the above mentioned mutual leak voltages.

In other words, even although no isolation or insulation input circuit such as one utilizing an isolation transformer or insulation transformer is used for the input circuits IN1 . .. INn, nevertheless, since the common mode voltage noises are eliminated, not only the size of the multi channel temperature controller of the present invention can be minimized, but also its manufacturing cost is reduced due to the employment of a simplified circuit structure.

Although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. A multi channel temperature controller, comprising:
   a plurality of temperature sensors producing a plurality of output signals;
   a selection means for providing a plurality of selection signals;
   an electronic multiplexer which receives said plurality of output signals from said plurality of temperature sensors and from said selection means, said electronic multiplexer sequentially supplying said signals to its output according to at least one of said selection signals;
   a plurality of input circuits, one interposed between said electronic multiplexer and each of said temperature sensors for removing noise from said output signals; and
   an amplifier which receives said output of said electronic multiplexer.

2. A multi channel temperature controller according to claim 1, wherein each of said input circuits comprises a capacitor which has electrostatic capacitance substantially greater than the electrostatic capacitance existing between said input circuit and the corresponding temperature sensor.

3. A multi channel temperature controller according to claim 2, wherein each of said input circuits further includes a pair of leads and a pair of resistors, one of said resistors being connected in series in each lead between said corresponding temperature sensor and said multiplexer, and wherein said capacitor is coupled between said corresponding temperature sensor and a ground.

4. A multi channel temperature controller according to claim 1, wherein said amplifier has a gain equal to unity.

5. A multi channel temperature controller according to claim 1, wherein said amplifier has a high common mode rejection ratio.

* * * * *